United States Patent Office 2,919,283
Patented Dec. 29, 1959

2,919,283
PROCESS OF EPOXIDATION

Frank P. Greenspan and Ralph J. Gall, Buffalo, N.Y., assignors, by mesne assignments, to Food Machinery and Chemical Corporation, San Jose, Calif., a corporation of Delaware No Drawing. Application October 18, 1954
Serial No. 463,060

6 Claims. (Cl. 260—348.5)

This invention relates to an improved method of in situ epoxidation of compounds containing an ethylenic linkage and more particularly to an in situ epoxidation method employing hydrogen peroxide, acetic acid and an ion exchange resin as a reaction catalyst.

An in situ method of epoxidizing unsaturated compounds such as unsaturated fatty acid esters is described in patent No. 2,801,253, July 30, 1957, in the names of the present inventors. In that method an ester of an unsaturated higher fatty acid is reacted at temperatures between about 60 and 100° C. with hydrogen peroxide, acetic acid and a small amount of sulfuric acid for a period of time of from ½ to 21 hours. The reaction may be performed either in the presence or in the absence of a solvent. In that method, the presence in the reaction mixture of from about ½% to 5% sulfuric acid, based upon the combined weight of acetic acid, and aqueous hydrogen peroxide, is a requirement of the invention in order to obtain high yields of epoxidized material at the elevated temperatures and relatively short periods of time of the reaction. Other mineral acids, even those known to be efficient peracid formation catalysts do not function in this reaction as sulfuric acid does and cannot be used. In this method the amount of acetic acid per mole of unsaturated ester treated is from 0.25 mole to 1 mole. The hydrogen peroxide serving as a source of oxygen should be present in approximately molar quantities for each double bond present in the product to be epoxidized. A slight excess will generally be employed.

We have now found that the sulfuric acid used in this type of in situ epoxidation can be replaced by a suitable ion exchange resin in its acid form acting as a catalyst. The present invention is based on the discovery that ion exchange resins in their acid form, i.e. cation exchange resins, represent a source of hydrogen ions which function as a catalyst in peracid forming effects in a manner similar to the hydrogen ions supplied from sulfuric acid present in the reaction medium in the prior procedure. The advantage derived from the use of an ion exchange resin instead of sulfuric acid in an in situ expoxidation process is that no unwanted or foreign ions are introduced into the reaction medium. This being the case, undesirable side reactions of such ions with other reactants present cannot take place. By-product formation such as the formation of monosulfate esters when epoxidizing an unsaturated ester is avoided, high yields of epoxy compound are assured and ring opening or subsequent discoloration of the epoxy product is substantially avoided.

In our improved method of in situ epoxidation of unsaturated fatty acid esters, the main reactants are the unsaturated fatty acid ester, hydrogen peroxide, acetic acid and a relatively small amount of a suitable ion exchange resin, i.e. an amount sufficient to catalyze the epoxidation reaction. Ordinarily an amount of resin corresponding to about 5 to 25% of the combined weight of hydrogen peroxide and acetic acid will produce highly satisfactory results. Higher percentages of resin may be used but do not offer any particular advantages. This resin is present in the reaction mixture during the course of the reaction and after completion of the reaction is separated from the desired epoxy product by any suitable means such as filtration, settling or centrifugation. The recovered resin may be reused.

Of the various types of ion exchange resins available, the nuclear sulfonic types are particularly effective, although phenolic methylene sulfonic types may be used. Of course, the ion exchange resin before use must be in its acid form and to assure this, it may be preferably to treat the resin before use with a dilute solution of a mineral acid such as sulfuric acid, hydrochloric acid or other acid.

The following examples will illustrate the method of this invention:

Example 1

100 g. of butyl oleate (iodine No. 74 and equivalent to 0.29 mole of ethylenic unsaturation) were weighed into a 3-necked flask equipped with a reflux condenser, thermometer and stirrer. 20 g. of benzene, 9.2 g. of glacial acetic acid (0.153 mole) and 1.5 g. (5% by weight of the hydrogen peroxide-acetic acid mixture) of a nuclear sulfonic type cation exchange resin (Amberlite IR–120) were added to the flask and the mixture warmed to about 60° C. Then 21.78 g. of hydrogen peroxide 50% (0.32 mole) were added slowly over one hour. The temperature was controlled between 59 and 63° C. until the reaction was complete. After about 12 hours, approximately 95% of the hydrogen peroxide had reacted and the reaction mixture was then separated from the resin. Thereafter, the mixture was poured into a separatory funnel and the aqueous layer drawn off. The oil layer was washed with warm water until free of acetic acid, dried with anhydrous sodium sulfate and filtered. An analysis of the clear, pale, yellow oil gave the following results:

Percent oxirane oxygen 3.8 corresponding to about 84% epoxy ester iodine No. 4 corresponding to about 94% double bonds reacted.

Example 2

The procedure of Example 1 was followed in every respect with the exception that no benzene solvent was used. The analysis of the clear, pale, yellow oil recovered gave the following results:

Percent oxirane oxygen 3.5 corresponding to about 77% epoxy ester iodine No. 7 corresponding to about 90% double bonds reacted.

Example 3

The procedure of Example 1 was followed with the exception that no solvent was used. Moreover, another brand of a nuclear sulfonic type cation exchange resin (Dowex 50X) was used in an amount of 25% based on the combined weight of hydrogen peroxide and acetic acid. The reaction was complete in about 6 hours and an analysis of the end product gave the following results:

Percent oxirane oxygen 3.8 corresponding to about 84.4% epoxy ester iodine No. 2 corresponding to about 97.3% double bonds reacted.

Example 4

50 g. of soybean oil (iodine No. 135, equivalent to 0.26 mole of ethylenic unsaturation) were weighed into a 3-necked flask equipped with a reflux condenser, thermometer and stirrer. Then 7.9 g. of glacial acetic acid (0.13 mole) 1.4 g. (5% by weight of the hydrogen peroxide-acetic acid mixture) of a nuclear sulfonic type cation exchange resin (Amberlite IR–120) were added to the flask. Then 19.9 g. of hydrogen peroxide 50% (0.29 mole) were slowly added to the mixture over a period of 2 hours. During that time, the reaction mixture was kept at a temperature of about 50 to 60° C. and maintained at 60° C. for approximately 12 more hours, after which time the reaction was complete. The reaction mixture was then separated from the resin and recovered as described in Example 1. Analysis of the end product gave the following results:

Percent oxirane oxygen 5.9 corresponding to about 76% epoxy ester iodine No. 5 corresponding to about 96.3% double bonds reacted.

*Example 5*

The procedure of Example 4 was followed in every detail but 25% of a nuclear sulfonic type cation exchange resin (Dowex 50X) was used. The reaction was complete in approximately 6 hours and an analysis of the end product gave the following results:

Percent oxirane oxygen 6.5 corresponding to about 83.4% epoxy ester iodine No. 6.5 corresponding to about 95.2% double bonds reacted.

*Example 6*

The procedure of Example 4 was again followed in every detail but 150% of a nuclear sulfonic type cation exchange resin (Amberlite IR-120) was used. The reaction was complete in approximately 3 hours and an analysis of the end product gave the following results:

Percent oxirane oxygen 6.2 corresponding to about 79.5% epoxy ester iodine No. 12 corresponding to about 91% double bonds reacted.

*Example 7*

The procedure of Example 1 was followed in detail but 150% of a nuclear sulfonic type cation exchange resin (Dowex 50X) was used. The reaction was complete in about 3 hours and an analysis of the end product gave the following results:

Percent oxirane oxygen 3.4 corresponding to about 75.5% epoxy ester iodine No. 2 corresponding to about 97.3% double bonds reacted.

From the above it will be seen that a very desirable in situ epoxidation process, i.e., one in which hydrogen peroxide and a lower fatty acid are used in the presence of a catalyst, as reactants, is provided for the epoxidation of compounds containing an ethylenic linkage. The procedure is especially advantageous for the epoxidation of esters of the higher unsaturated fatty acids. The ester may be that of a monohydric alcohol or a polyhydric alcohol with the higher unsaturated fatty acid, i.e., an unsaturated aliphatic acid of from about 8 to 24 or more carbon atoms and is especially suitable for epoxidation of esters of oleic, linoleic and linolenic acids, fatty acids occurring in the naturally occurring vegetable and animal oils and fats. The amount of cation exchange resin employed will be an amount sufficient to catalyze the epoxidation and should be at least about 5% by weight based upon the epoxidation reactants used, i.e., on the hydrogen peroxide and lower saturated fatty acid, i.e., acetic, formic, propionic, of which acetic acid is the preferred acid. The reaction temperature is in the range 50° C. to 100° C. when employing the resin as catalyst.

Dowex 50 is a trade name designating a series of sulfonated copolymers of styrene with divinyl benzene, containing varying amounts of divinyl benzene, that is about 2% to 24% of divinyl benzene. These materials are produced by the Dow Chemical Company of Midland, Michigan. The term Amberlie IR-120 indicates a product of the Rohm & Haas Company, Washington Square, Philadelphia 5, Pennsylvania, which is also a sulfonated copolymer of styrene with divinyl benzene, this product containing about 8% of divinyl benzene. Both the Dowex 50 and Amberlite IR-120 products are nuclear sulfonic type cation exchange resins.

What is claimed is:

1. The method of epoxidizing an ester of an unsaturated higher fatty acid which comprises mixing acetic acid, aqueous hydrogen peroxide and an acid cation exchange resin from the group consisting of nuclear sulfonic and phenolic methylene sulfonic cation exchange resins, with said ester and heating the mixture to the range 50° C. to 100° C. and maintaining this temperature during the epoxidation reaction, the amount of acetic acid being from about 0.25 mol to 1.0 mol per mol of unsaturation to be reacted, the amount of hydrogen peroxide being about one mol per mol of unsaturation to be reacted and the amount of cation exchange resin being at least about 5-25% by weight based on said hydrogen peroxide and said acetic acid.

2. The method of claim 1 wherein the ester is butyl oleate.

3. The method of claim 1 wherein the ester is soybean oil.

4. The method of claim 1 wherein the cation exchange resin is of the nuclear sulfonic type.

5. The method of claim 1 wherein the resin is of the phenolic methylene sulfonic type.

6. In the epoxidation of an ester of an olefinically unsaturated higher fatty acid at a temperature below about 100° C. with a per-lower alkanoic acid prepared in situ from a lower alkanoic acid and aqueous hydrogen peroxide, the improvement which consists in carrying out the reaction in the presence of a catalytic amount of a sulfonated copolymer of styrene with about 8% divinyl benzene in its acid form.

References Cited in the file of this patent

UNITED STATES PATENTS

| | | |
|---|---|---|
| 2,443,280 | Swern | June 15, 1948 |
| 2,485,160 | Niederhauser | Oct. 18, 1949 |
| 2,629,735 | Cottle | Feb. 24, 1953 |
| 2,801,253 | Greenspan et al. | July 30, 1957 |

FOREIGN PATENTS

| | | |
|---|---|---|
| 676,891 | Great Britain | Aug. 6, 1952 |

OTHER REFERENCES

Kunin: Ion Exchange Resins, pp. 137-9 (1950).

Du Pont Electrochemicals Dept. Peroxygen Products Bulletin No. P-61-454 (published April 1954).